(12) United States Patent
Robinson et al.

(10) Patent No.: US 6,357,249 B1
(45) Date of Patent: Mar. 19, 2002

(54) VEHICLE ROOFTOP AIR CONDITIONER

(75) Inventors: Philip R. Robinson, Mulvane; Alan S. Lowe; David D. Gehlen, both of Wichita, all of KS (US)

(73) Assignee: Airxcel, Inc., Wichita, KS (US)

( * ) Notice: Subject to any disclaimer, the term of this patent is extended or adjusted under 35 U.S.C. 154(b) by 0 days.

(21) Appl. No.: 09/833,170

(22) Filed: Apr. 11, 2001

(51) Int. Cl.[7] .......................... F25D 21/14; F25D 17/06; B60H 1/32
(52) U.S. Cl. ............................ 62/285; 62/244; 62/419
(58) Field of Search .................... 62/239, 244–248, 62/259.1, 263, 326, 407, 419; 98/40.05; 415/211.1; 454/100

(56) References Cited

U.S. PATENT DOCUMENTS

| | | | |
|---|---|---|---|
| 4,554,796 A | * 11/1985 | Stankard | 62/326 |
| 4,641,502 A | * 2/1987 | Aldrich et al. | 62/244 |
| 4,672,818 A | * 6/1987 | Roth | 62/239 |
| 4,709,623 A | * 12/1987 | Roth et al. | 98/40.05 |
| 4,747,275 A | * 5/1988 | Amr et al. | 62/419 |
| 4,800,734 A | * 1/1989 | Sauber et al. | 62/263 |
| 5,531,641 A | * 7/1996 | Aldrich | 454/100 |
| 5,738,492 A | * 4/1998 | Stanko et al. | 415/211.1 |
| 5,890,373 A | * 4/1999 | Smith | 62/248 |
| 5,943,878 A | * 8/1999 | Smiley, III et al. | 62/407 |
| 6,101,829 A | * 8/2000 | Robinson | 62/259.1 |

* cited by examiner

Primary Examiner—William Doerrler
Assistant Examiner—Filip Zec
(74) Attorney, Agent, or Firm—Shook, Hardy & Bacon LLP

(57) ABSTRACT

An air conditioner is provided which is mounted on the rooftop of a recreational vehicle to provide cooling of an interior space within the vehicle. The air conditioner has a single motor that mounts both a centrifugal fan and an axial fan for rotation about a vertical axis. The centrifugal fan is positioned within an evaporator compartment that contains an evaporator for providing cooling of an air stream drawn therethrough. The centrifugal fan draws warm air from within the interior space of the vehicle into the evaporator compartment where it passes through the evaporator and is then drawn axially through a center opening into the centrifugal fan. The cooled air is expelled tangentially from the centrifugal fan and is redirected downwardly by a surrounding scroll and delivered to the interior space for cooling thereof. The axial fan is positioned in a condenser compartment where it draws outdoor air through a condenser for heat exchange therewith. The outdoor air is then exhausted vertically upward through a opening in an outer shroud. Because the fans are mounted for vertical rotation, their diameters are not constrained by the vertical dimension of the air conditioner. A pump is also provided to deliver external condensate from the evaporator to an exhaust side of the axial fan. A plurality of the air conditioners can be stacked one on top of the other during shipping by using plugs which upwardly from the shroud and are received within hole or recesses formed in a base pan of the overlying air conditioner.

26 Claims, 3 Drawing Sheets

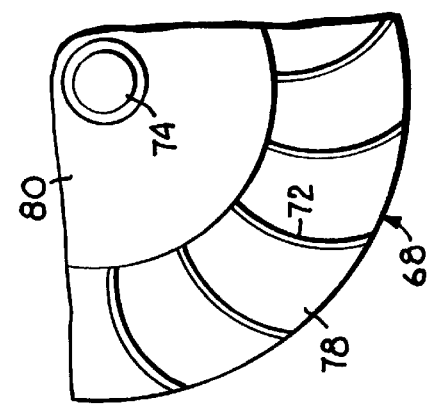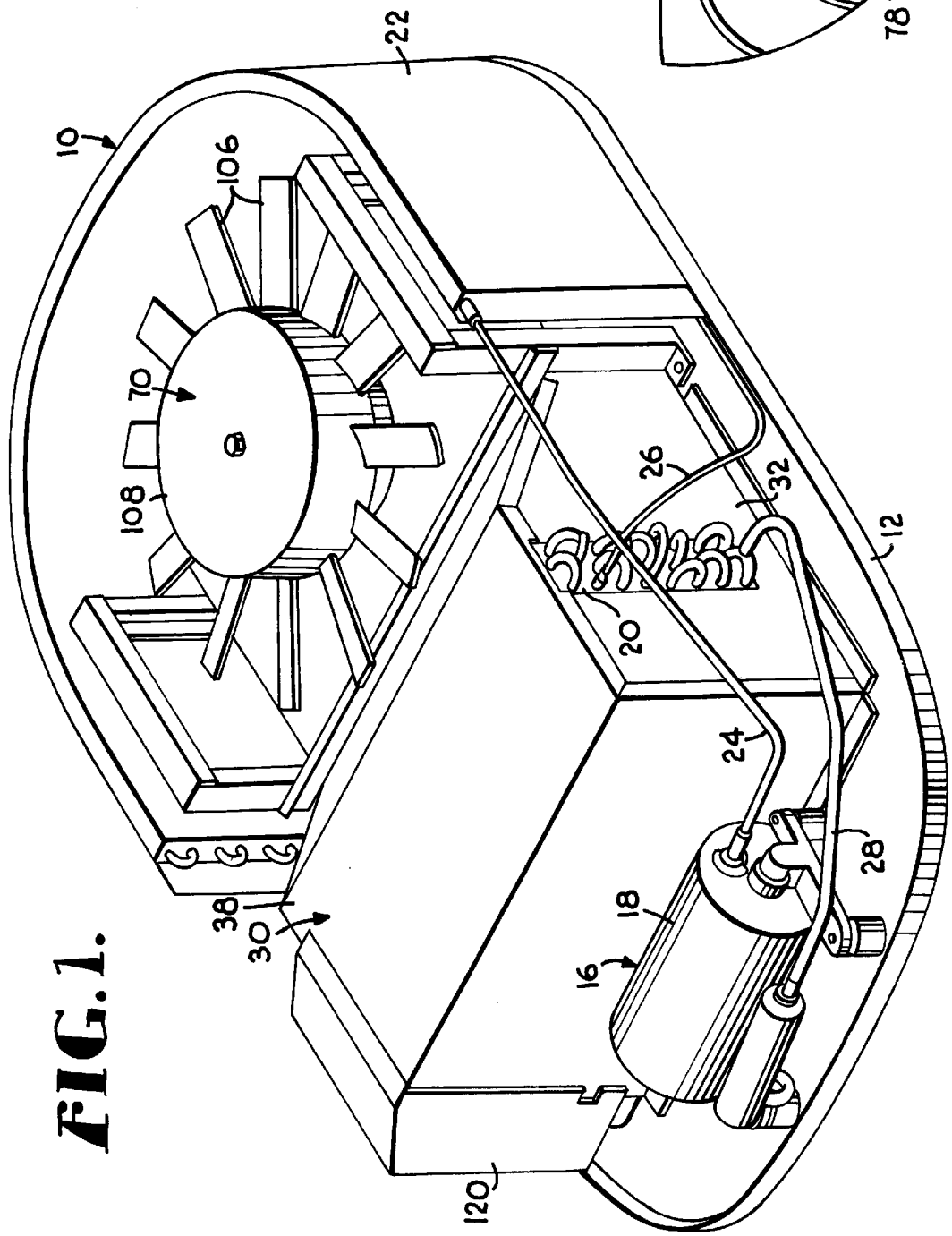

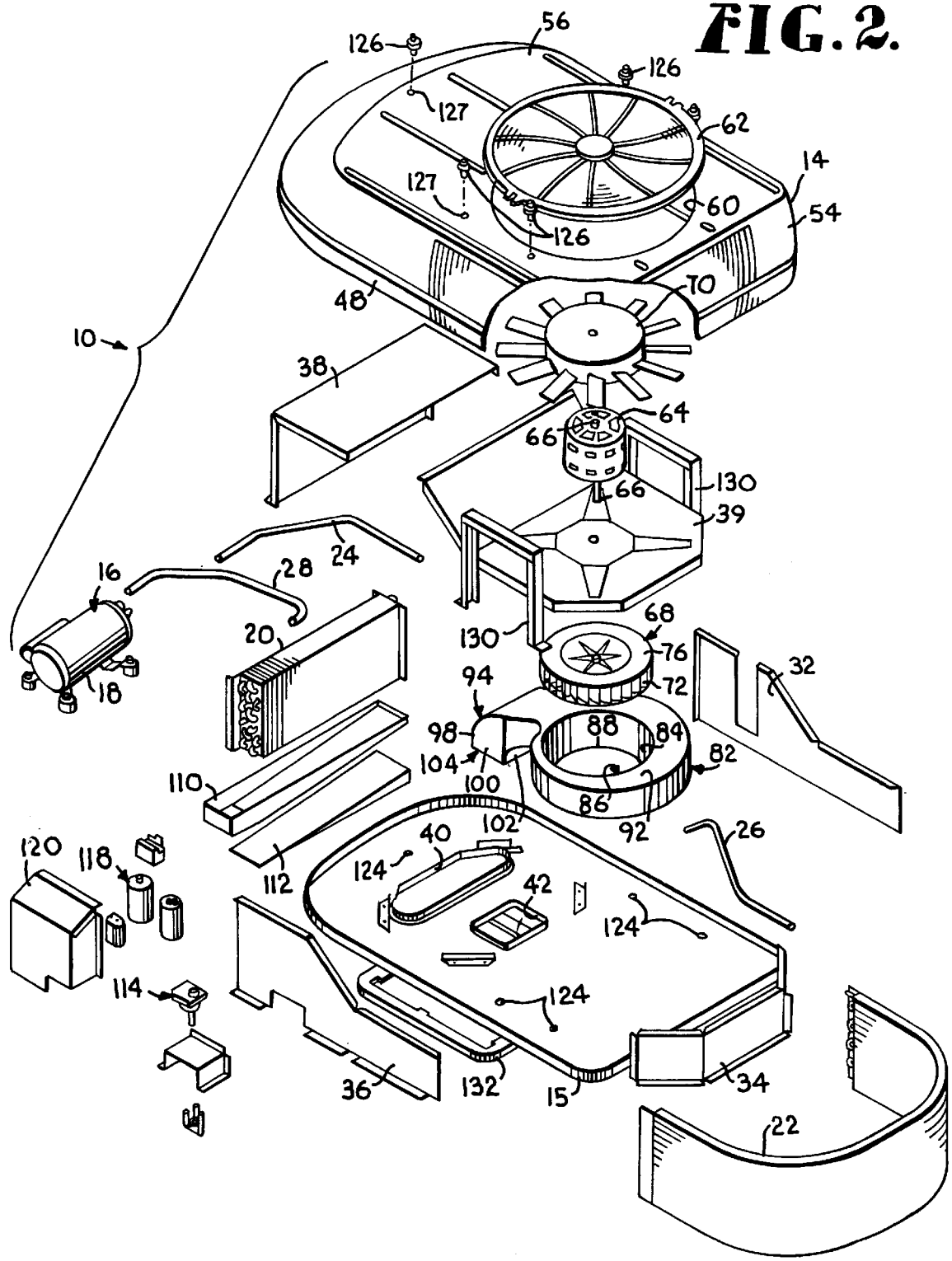

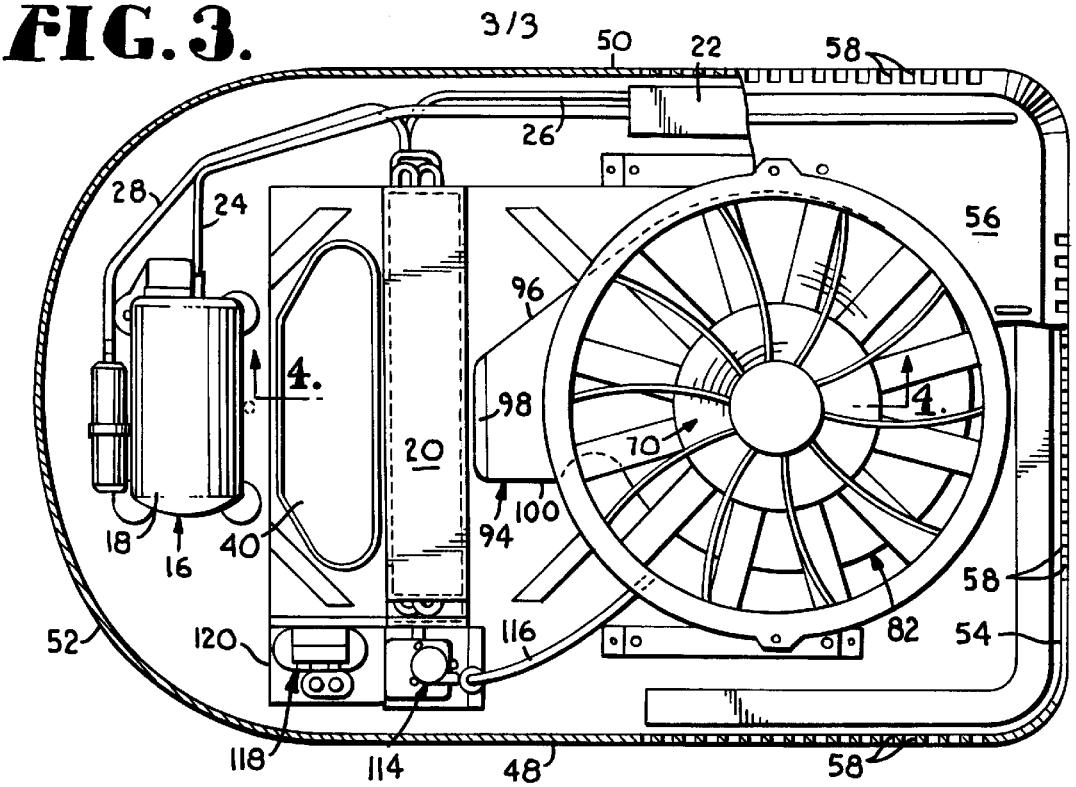
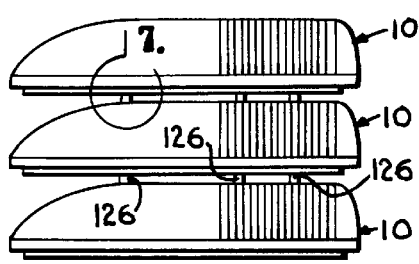
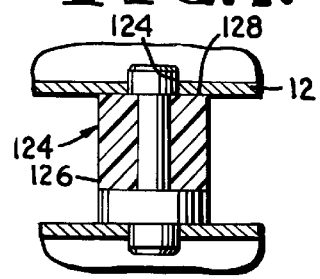
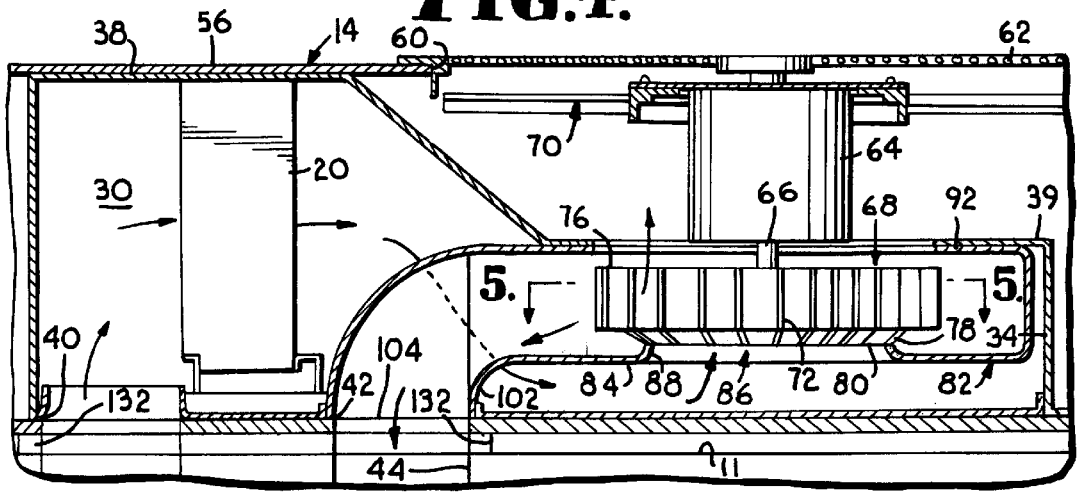

VEHICLE ROOFTOP AIR CONDITIONER

BACKGROUND OF THE INVENTION

The present invention relates generally to air conditioners and, more particularly, to air conditioners mounted on the roof of vehicles such as recreational vehicles.

Rooftop mounted air conditioners are commonly used on recreational vehicles to circulate cooled or conditioned air to the interior of the vehicle. These rooftop air conditioners include a compression refrigeration system comprising a compressor, condenser, evaporator and other components which are housed within an outer shroud and supported on a base pan. In a typical application, a centrifugal evaporator fan is provided in a plenum or chamber to draw warm indoor air from within the vehicle, direct it through the evaporator to cool the air, and then return the cooled air to the vehicle. The evaporator fan is mounted for rotation about a horizontal axis so that the tangentially directed fan discharge can be ducted directly downwardly into the interior of the vehicle. In a separate chamber, a centrifugal condenser fan draws outdoor air through grill openings in the shroud and pulls or blows it through the condenser to provide cooling of the refrigerant carried within the condenser coils. The evaporator and condenser fans are also variously referred to as impellers, wheels, propellers, and blowers.

In rooftop air conditioners of the type described above, a single motor is typically used to drive both the evaporator and condenser fans in order to reduce the costs and space requirements that would be associated with a second motor. As a result, the fans are typically mounted on a single drive shaft that extends horizontally from opposite ends of the motor. While horizontal rotation of the centrifugal evaporator fan is desirable because it allows the tangentially discharged air to be ducted directly downward into the vehicle, the diameter and resulting air flow capacity of both fans is limited by the available vertical spacing between the base pan and outer shroud. The desire to reduce the bulky appearance of rooftop air conditioners and allow adequate clearance under bridges, carports and other overhead obstructions generally requires that the vertical spacing be limited as much as possible. In certain types of low profile rooftop air conditioners which are in increasing demand because of their streamlined and aerodynamic appearance, the vertical spacing between the base pan and shroud may be ten inches or less. Because it would be desirable to use larger diameter fans to achieve better operating performance, a need has developed for a way to mount both the evaporator and condenser fans for rotation about a common vertical axis using a single motor so that the diameter of the fans is not limited by the vertical spacing between the base pan and shroud.

Another problem associated with conventional rooftop air conditioners is the need to separately package each air conditioner during transportation from the factory to the dealership where it is installed on the vehicle. During shipping, it would be desirable to stack two more air conditioners together to reduce the quantity of shipping materials required and to facilitate handling of the air conditioners.

SUMMARY OF THE INVENTION

In one aspect, the present invention is directed to a vehicle rooftop air conditioner comprising a base pan having one or more openings forming a return air intake and a conditioned air outlet. A compression refrigeration system comprising a compressor, evaporator and condenser are operatively coupled together and positioned on the base pan. A first enclosure forming a conditioned air flow plenum houses the evaporator which is operable for heat transfer with an indoor air stream flowing therethrough. A centrifugal fan positioned within the first enclosure is operable to draw indoor air from the return air intake, through the evaporator and then into the centrifugal fan for tangential discharge in a substantially horizontal plane. A scroll surrounding the centrifugal fan forms an air passage for receiving the air tangentially discharged from the centrifugal fan and redirecting it in a downward direction to the conditioned air outlet. A second enclosure forms an outdoor air flow plenum and houses the condenser which is operable for heat transfer with an outside air stream flowing therethrough. A second fan which is preferably an axial fan is positioned and operable to draw air through said condenser. A single motor drives the centrifugal and axial fans which are mounted on a drive shaft for rotation about a vertical axis. Notably, the fan diameters are not constrained by the height of the air conditioner and larger diameter fans can be utilized to increase the cooling performance of the air conditioner while maintaining the desired low profile. The cooling performance can also be increased as a result of using an axial fan in the condenser compartment because outdoor air inlets can be placed in three sides of the shroud, thereby allowing use of a U-shaped, rather than L-shaped, condenser. External condensate from the evaporator can also be delivered to the exhaust side of the axial fan, thereby eliminating the streaking of the vehicle roof that often results from simply dumping the condensate onto the roof.

In another aspect, the invention is directed to a method of circulating conditioned and outdoor air in the air conditioner described above. The method includes the steps of rotating, about a common vertical axis, a centrifugal fan positioned within an evaporator enclosure and an axial fan positioned in a condenser compartment; causing, as a result of said rotating of the centrifugal fan, indoor air to be drawn from said interior space through a return air inlet into said evaporator enclosure and then through an evaporator for heat exchange and cooling of said air, said cooled air then being drawn into a center opening of said centrifugal fan and then being expelled tangentially from said centrifugal fan in a substantially horizontal plane; capturing at least some of said tangentially expelled air from said centrifugal fan in a surrounding scroll and redirecting it in a downward direction into said interior space for cooling thereof, directing, as a result of said rotating the axial fan, outdoor air through a condenser located in said condenser compartment for heat exchange therewith and then exhausting said outdoor air through said shroud.

BRIEF DESCRIPTION OF THE DRAWINGS

In the accompanying drawings which form part of the specification and in which like reference numerals are used to indicate like parts in the various views:

FIG. 1 is a top perspective view of a rooftop air conditioner constructed in accordance with the present invention and shown with the outer shroud removed to show internal details of construction;

FIG. 2 is an exploded view of the air conditioner with a portion of the shroud broken away for illustration purposes;

FIG. 3 is a top plan view of the air conditioner with portions of the outer shroud and internal components being removed to better illustrate the remaining components;

FIG. 4 is a fragmentary side elevation view of the air conditioner taken in vertical section along line 4—4 of FIG. 3 in the direction of the arrows;

FIG. 5 is a fragmentary top plan view of a centrifugal fan for moving indoor and conditioned air and taken in horizontal section along line 5—5 of FIG. 4 in the direction of the arrows;

FIG. 6 is a side elevation view of a plurality of the air conditioners stacked for transport and shown on a greatly reduced scale; and FIG. 7 is an enlarged fragmentary side elevation view of the air conditioners taken within the area designed by the circle 7 in FIG. 6 and showing a stacking block which facilitates stacking of the air conditioners.

DESCRIPTION OF THE PREFERRED EMBODIMENT

Referring now to the drawings in greater detail and initially to FIGS. 1–4, a rooftop air conditioner of the present invention is designated generally by the numeral 10. As shown in FIG. 4, the air conditioner 10 is mounted on a roof 11 of a vehicle which may be a van, motor home, trailer and the like. As used herein, the term recreational vehicle is intended to encompass all such motorized and non-motorized vehicles.

Air conditioner 10 includes a base pan 12 and an outer shroud 14 which is removably secured to a upstanding perimeter flange 15 on the base pan 12. Together, the base pan 12 and shroud 14 form an enclosure in which a compression refrigeration system 16 and other working components of the air conditioner 10 are housed.

The compression refrigeration system 16 comprises a horizontally disposed rotary compressor 18, an evaporator 20 and a condenser 22 which are operatively coupled together in a well known closed-loop manner which will only be generally described herein. Compressor 18 may be a rotary or piston type compressor and is preferably horizontally mounted, but can also be vertically mounted, on base pan 12. The compressor 18 compresses and raises the temperature of a refrigerant which is then delivered by a discharge line 24 to the condenser 22 where the compressed refrigerant is cooled by outside air flowing around the coils of the condenser 22. The cooled refrigerant then travels through line 26 to the evaporator 20 where it flows through an expansion valve or similar device (not shown). The refrigerant traveling through the coils of the evaporator 20 absorbs heat from indoor air passing around the coils of the evaporator and is then returned by a suction line 28 to the compressor 18. In this manner, the evaporator 20 and condenser 22 act as heat exchangers to respectively remove heat from the indoor air and transfer heat to the outside air.

The evaporator 20 is housed within an evaporator enclosure 30 formed from sheet metal bulkheads 32, 34 and 36, covers 38 and 39, and base pan 12. The evaporator enclosure 30 functions as a conditioned air flow plenum. To better illustrate the arrangement of other components, the bulkheads 32, 34 and 36 and covers 38 and 39 have been removed from the view shown in FIG. 3. The evaporator 20 is positioned between a return air inlet 40 and a spaced apart discharge outlet 42 which are formed in the base pan 12 and, as can best be seen in FIG. 4, are in fluid flow communication with an opening 44 formed in the roof 11 of the vehicle on which the air conditioner 10 is mounted. A ceiling assembly (not shown) is positioned within the opening 44 and optional ducts (not shown) are utilized in a conventional fashion to control air flow within the vehicle. The evaporator 20 is sized and positioned in cooperation with the enclosure 30 so that some, and preferably substantially all, of the indoor air flowing from the return air inlet 30 to the discharge outlet 42 must first pass through the evaporator 20 to cool the indoor air.

The condenser 22 is generally U-shaped in horizontal cross section and is located within a condenser enclosure 46 which is isolated from the evaporator enclosure 30 by the bulkheads 32, 34 and 36 as well as the covers 38 and 39. The condenser enclosure 46 functions as an outdoor air flow plenum and is formed generally by the base pan 12 and the curved sides 48 and 50, forward and aft ends 52 and 54, and top 56 of the shroud 14. Outside air intake openings 58 are provided in the sides 48 and 50 and aft end 54 of the shroud 14 to permit outside air to flow through the condenser 22 to transfer heat from the refrigerant to the outside air. An opening 60 and guard 62 are provided in the top of the shroud 14 to exhaust the outside air from the condenser enclosure 46 after it has passed through the condenser 22.

The air conditioner 10 includes a single electrical motor 64 having a drive shaft 66 that extends through the armature of the motor and out the opposite ends of the motor 64. In accordance with the present invention, the motor 64 is mounted so that the drive shaft 66 extends vertically and mounts an evaporator fan 68 on one end and a condenser fan 70 on the opposite end. In this manner, the evaporator and condenser fans 68 and 70 are in vertical alignment and rotate about a common vertical axis. As can best be seen in FIG. 4, the motor 64 is mounted on the bulkhead cover 39 with one end of the drive shaft 66 extending downwardly through the cover 39 so that the evaporator fan 68 is located within the evaporator enclosure 30. The opposite end of the drive shaft 66 mounts the condenser fan 70 within the condenser enclosure 46 in vertical alignment with the shroud exhaust opening 60 and the guard 62.

The evaporator fan 68 is a centrifugal fan that draws air in axially and expels it tangentially outward in the plane of rotation of the fan. As can best be seen in FIGS. 2, 4 and 5, the evaporator fan 68 has a plurality of curved blades 72 arrayed radially about, and spaced from, a center hub 74 which mounts to the motor drive shaft 66. The evaporator fan 68 has a top 76, which is closed except for a small center opening for the drive shaft 66, and a ring-shaped bottom 78 which defines a venturi opening 80 that permits the axial inflow of air into the fan 68. The blades 72 are attached to the top 76 and bottom 78 so that air axially enters the spinning evaporator fan 68 through the venturi opening 80 and then travels along the blades 72 before being expelled tangentially outwardly in the plane of rotation of the fan.

The air expelled by the evaporator fan 68 is captured by a generally ring-shaped scroll 82 which surrounds the evaporator fan 68. A bottom 84 of the scroll 82 has a center opening 86 of a size corresponding to the venturi opening 80 in the overlying evaporator fan 68. As shown in FIG. 4, that portion of the bottom 84 surrounding the center opening 86 includes an upturned lip 88 which cooperates with the curved bottom 78 of the evaporator fan 68 to form a venturi for air entering the evaporator fan through the venturi opening 80.

The scroll 82 further includes a circular sidewall 90 joined to the bottom 84 and a ring-shaped top 92 which abuts the undersurface of cover 39. A curved outlet throat 94 is formed in the sidewall 90 of the scroll 82 to capture the air flowing circularly within the scroll 82 and redirect it to a downward direction. As can best be seen in FIG. 3, the throat 94 is defined in part by an inlet wall 96 that extends tangentially from the sidewall 90 and terminates in an end wall 98. Another wall 100 extends perpendicularly from end wall 98 and rejoins the circular sidewall 90 along an inwardly protruding curved section that divides the air flow between the throat 94 and circular sidewall 90. The walls 96, 98 and 100, together with a curved lower inlet wall 102, form a throat discharge opening 104 that lies in a horizontal plane and is positioned in the discharge outlet 42 formed in the base pan 12. In this manner, the throat 94 serves to capture the air flowing in a horizontal plane along the circular sidewall 90 within the scroll 82 and redirect it downwardly into the discharge outlet 42 in the base pan 12 for delivery into the vehicle on which the air conditioner 10 is mounted. The scroll 82 is horizontally offset in relation to the evaporator fan 68 so that the distance between the circular sidewall 90 and the outer perimeter of the evaporator fan 68 increases in the direction of air flow along the circular sidewall 90 to accommodate the increasing volumetric air flow in the direction of the throat 94.

The condenser fan 70, in contrast to the evaporator fan 68, is preferably an axial flow fan. A plurality of blades 106 extend outwardly from a central hub 108 and are oriented to draw air horizontally through the intake openings 58 in shroud 14 for passage through and heat exchange with the condenser 22. The air is then drawn upwardly through the fan blades 106 and discharged through the opening 60 in the shroud 14. Notably, because the condenser fan 70 discharges upwardly rather than horizontally as is the case in conventional rooftop air conditioners, the outside air intake openings 58 may be located in those areas of the shroud 14 that would normally be dedicated to exhaust air flow. As a result, the condenser 22 may extend into those areas where the additional intake openings 58 are located, allowing the condenser 22 to have a U-shaped rather than an L-shaped horizontal cross section with a correspondingly increased heat transfer capacity.

The condensate that collects on the evaporator 20 drains into a drip tray 110 that is positioned underneath the evaporator 20. A wedge 112 elevates one end of the drip tray 110 to cause the condensate to drain to the opposite end of the drip tray 110 where it is picked up by a pump 114 for delivery through a conduit 116 to the exhaust side of the condenser fan 70. This allows the condensate to be expelled with the fan exhaust rather than draining onto the roof of the vehicle where it can cause unsightly streaks and stains. Electrical components and controls 118 are positioned beside the pump 114 and are protected by a box cover 120.

The air conditioner 10 also includes means 122 for stacking two or more air conditioners 10 one on top of the other in the manner shown in FIG. 6 during shipping. As can best be seen in FIGS. 2 and 7, the stacking means 122 includes recesses or holes 124 formed in the underside of the base pan 12 which align with removable plugs 126 placed in the top 56 of the shroud 14. The plugs 126 extend upwardly through holes 127 (FIG. 2) in the shroud 14 and are of a sufficient length to be received within the holes 124 in the overlying base pan 12. The plugs 126 preferably have shoulders 128 formed therein to abut the base pan 12 and cause a slight separation between the shroud 14 and overlying base pan 12 when the air conditioners 10 are stacked together. After shipping, the plugs 126 can be left in place or removed and replaced with a flush sealing member. A pair of spaced apart internal legs 130 having an inverted U-shape are supported on the base pan 12 and abut the lower ends of plugs 126 so that a significant portion of the weight of the stacked air conditioners 10 is transferred to the base pan 12 rather than being carried by the shroud 14. A gasket 132 which is positioned between the base pan 12 and the vehicle roof 11 when the air conditioner 10 is installed on the roof is preferably removed during shipping so that it does not interfere with the stacking of the air conditioners.

In use, the spinning evaporator fan 68 draws warm indoor air from within the vehicle into the evaporator enclosure 30 through the return air inlet 40. The warm indoor air then passes through the coils of the upright evaporator 20 and is cooled as result of heat exchange with the refrigerant in the evaporator coils. The cooled air is then drawn upwardly through the center opening 86 in the evaporator fan 68 and is expelled tangentially outwardly by the fan blades 72. The expelled air is then captured by the scroll 82 and is redirected downwardly by the throat 94. The air exits the throat 94 through the discharge opening 104 and passes downwardly through discharge outlet 42 in the base pan 12 for entry into the ceiling assembly in the vehicle. In this manner, cooled or conditioned air is circulated into the vehicle and warm air is returned to the air conditioner 10 for cooling.

It can readily be appreciated that mounting the evaporator and condenser fans 68 and 70 for rotation about a vertical rather than horizontal axis allows the fan diameters to be increased to the width available within the shroud 14, rather than being limited by the available height between base pan 12 and shroud top 56 as is the case in conventional rooftop air conditioners. Increasing the fan diameters allows greater cooling performance to be achieved by air conditioner 10 in comparison to other low profile air conditioners having the same vertical distance between the base pan 12 and shroud top 56. Indeed, tests of air conditioner 10 have demonstrated a cooling capacity of approximately 11,000 BTUs/hr and indoor air flow rates of approximately 300 CFM at approximately 13 amps in comparison to some conventional low profile rooftop air conditioners that achieve a cooling capacity of approximately 9,500 BTUs/hr and indoor air flow rates of approximately 240–250 CFM at approximately 16 amps. By using only a single motor 64 to drive evaporator and condenser fans 68 and 70, the performance increases are achieved without the added costs and space requirements of a second motor.

It can also be appreciated that the design of the air conditioner 10 allows the compressor 18 to be located at the forward end of the base pan 12 while the motor 64 and fans 68 and 70 are located in the aft end of the base pan 12 to more evenly distribute the weight borne by the base pan 12.

From the foregoing it will be seen that this invention is one well adapted to attain all ends and objects hereinabove set forth together with the other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A vehicle rooftop air conditioner comprising:
   a base pan having one or more openings forming a return air intake and a conditioned air outlet;
   a compression refrigeration system supported on the base pan comprising a compressor, evaporator and condenser operatively coupled together;
   a first enclosure forming a conditioned air flow plenum above said base pan, said evaporator being located within said first enclosure and being operable for heat transfer with an indoor air stream flowing therethrough;
   a centrifugal fan positioned within said first enclosure and operable to draw indoor air from the return air intake, through the evaporator and then into the centrifugal fan for tangential discharge in a substantially horizontal plane;

a scroll positioned about the centrifugal fan and forming an air passage for receiving the air tangentially discharged from the centrifugal fan and redirecting it in a downward direction to the conditioned air outlet;

a second enclosure forming an outdoor air flow plenum above said base pan, said condenser being located within said second enclosure and being operable for heat transfer with an outside air stream flowing therethrough;

a second fan positioned and operable to draw air through said condenser; and a motor having a drive shaft on which said centrifugal fan and said second fan are mounted for rotation about a vertical axis.

2. The air conditioner of claim 1, wherein said second fan is an axial fan.

3. The air conditioner of claim 2, including a vertical drive shaft extending from opposite ends of the motor and wherein said centrifugal fan is mounted on said drive shaft at one end of the and said axial fan is mounted on said drive shaft at an opposite end of the motor.

4. The air conditioner of claim 3, including a shroud coupled with the base pan and covering at least said first and second enclosures and having a top and sides, said top being spaced a preselected vertical distance above said base pan.

5. The air conditioner of claim 4, wherein the axial fan has a horizontal diameter greater than the vertical spacing of the shroud above the base pan.

6. The air conditioner of claim 5, including a drip tray positioned for collecting external condensate from the evaporator, a pump positioned to receive at least a portion of the collected external condensate, and a fluid flow conduit positioned to deliver the collected external condensate from the pump to an exhaust side of the axial fan.

7. The air conditioner of claim 2, including a shroud coupled with the base pan and covering at least said first and second enclosures and having a top and sides.

8. The air conditioner of claim 7, including means carried by the shroud and base pan for vertically stacking at least two of said air conditioners one on top of the other.

9. The air conditioner of claim 7, wherein said shroud forms part of said second enclosure.

10. The air conditioner of claim 9, including a plurality of outdoor air inlet openings in said sides of the shroud and an exhaust opening in said top of the shroud in alignment with said axial fan.

11. The air conditioner of claim 10, wherein said condenser is generally U-shaped in horizontal cross section.

12. The air conditioner of claim 2, wherein said compressor is located in a forward portion of the base pan and said centrifugal fan and said axial fan are located in a rear portion of the base pan.

13. The air conditioner of claim 2, wherein said scroll has a generally circular sidewall and a throat is formed in said sidewall, said throat having an inlet in a generally vertical plane and an outlet in a generally horizontal plane.

14. An air-conditioner mounted on a roof of a recreational vehicle having an interior space and one or more openings in said roof for delivery of conditioned air to said interior space and return of indoor air to said air conditioner, said air conditioner comprising:

a base pan positioned on said roof and having one or more openings forming a return air intake and a conditioned air outlet in communication with said one or more openings in the roof;

a compression refrigeration system on said base pan and comprising a compressor, evaporator and condenser operatively coupled together;

a first enclosure forming a conditioned air flow plenum above said base pan, said evaporator being located within said first enclosure and being operable for heat transfer with an indoor air stream flowing therethrough;

a centrifugal fan positioned within said first enclosure and operable to draw indoor air from the interior space through said return air intake, through the evaporator and then into the centrifugal fan for tangential discharge in a substantially horizontal plane;

a scroll positioned about the centrifugal fan and forming an air passage for receiving the air tangentially discharged from the centrifugal fan and redirecting it in a downward direction to the conditioned air outlet for delivery into the interior space;

a second enclosure forming an outdoor air flow plenum above said base pan, said condenser being located within said second enclosure and being operable for heat transfer with an outside air stream flowing therethrough;

a second fan positioned and operable to draw air through said condenser;

a motor driving said centrifugal fan and said second fan;

a vertically extending drive shaft extending from opposite ends of the motor and wherein said centrifugal fan is mounted on said drive shaft at one end of the motor and said second fan is mounted on said drive shaft at an opposite end of the motor; and a shroud covering at least said first and second enclosures and having a top and sides, said top being spaced a preselected vertical distance above said base pan.

15. The air conditioner of claim 14, wherein said second fan is an axial fan.

16. The air conditioner of claim 15, wherein the axial fan has a horizontal diameter greater than the vertical spacing of the shroud above the base pan.

17. The air conditioner of claim 15, including a drip tray positioned for collecting external condensate from the evaporator, a pump positioned to receive at least a portion of the collected external condensate, and a fluid flow conduit positioned to deliver the collected external condensate from the pump to an exhaust side of the axial fan.

18. The air conditioner of claim 15, including means carried by the shroud and base pan for vertically stacking at least two of said air conditioners one on top of the other.

19. The air conditioner of claim 15, wherein said shroud forms part of said second enclosure.

20. The air conditioner of claim 15, including a plurality of outdoor air inlet openings in said sides of the shroud and an exhaust opening in said top of the shroud in alignment with said axial fan.

21. The air conditioner of claim 15, wherein said condenser is generally U-shaped in horizontal cross section.

22. The air conditioner of claim 15, wherein said compressor is located in a forward portion of the base pan and said centrifugal fan and said axial fan are located in a rear portion of the base pan.

23. The air conditioner of claim 15, wherein said scroll has a generally circular sidewall and a throat is formed in said sidewall, said throat having an inlet in a generally vertical plane and an outlet in a generally horizontal plane.

24. A method of circulating conditioned and outdoor air in an air conditioner mounted on a roof of a recreational vehicle having an interior space, said air conditioner having a base pan and a covering shroud having a top spaced a preselected vertical distance above said base pan, said method comprising the steps of:

rotating, about a common vertical axis, a centrifugal fan positioned within an evaporator enclosure and an axial fan positioned in a condenser compartment;

causing, as a result of said rotating of the centrifugal fan, indoor air to be drawn from said interior space through a return air inlet into said evaporator enclosure and then through an evaporator for heat exchange and cooling of said air, said cooled air then being drawn into a center opening of said centrifugal fan and then being expelled tangentially from said centrifugal fan in a substantially horizontal plane;

capturing at least some of said tangentially expelled air from said centrifugal fan in a surrounding scroll and redirecting it in a downward direction into said interior space for cooling thereof;

directing, as a result of said rotating of the axial fan, outdoor air through a condenser located in said condenser compartment for heat exchange therewith and then exhausting said outdoor air through said shroud.

25. The method of claim 24, including collecting external condensate from a said evaporator and directing said collected external condensate to an exhaust side of said axial fan.

26. The method of claim 24, including providing an axial fan having a horizontal diameter greater than said preselected vertical distance.

* * * * *